United States Patent [19]
Valsö et al.

[11] Patent Number: 6,042,639
[45] Date of Patent: Mar. 28, 2000

[54] FIRE RETARDING COMPOSITION AND A METHOD FOR IMPREGNATION OF A COMBUSTIBLE MATERIAL

[75] Inventors: Arve Valsö, Vallersund; Egil Kleven, Trondheim, both of Norway

[73] Assignee: Fireguard Scandinavia AS, Tronheim, Norway

[21] Appl. No.: 09/117,698

[22] PCT Filed: Dec. 1, 1997

[86] PCT No.: PCT/NO97/00319

§ 371 Date: Oct. 19, 1998

§ 102(e) Date: Oct. 19, 1998

[87] PCT Pub. No.: WO98/24604

PCT Pub. Date: Jun. 11, 1998

[30] Foreign Application Priority Data

Dec. 4, 1996 [NO] Norway ..................................... 965175

[51] Int. Cl.$^7$ ............................. B27K 3/52; C09K 21/10; D06M 13/322; D06M 11/70; D21H 17/07
[52] U.S. Cl. .................................... 106/18.15; 106/18.16; 106/18.17; 252/601; 252/607; 252/608; 427/296; 427/297; 427/384; 427/394; 427/395; 427/396; 427/397; 427/421; 427/430.1; 427/439; 427/440; 428/921
[58] Field of Search ............................. 106/18.14, 18.15, 106/18.16, 18.17; 252/601, 607, 608; 427/296, 297, 384, 394, 395, 396, 397, 421, 430.1, 439, 440; 428/921

[56] References Cited

U.S. PATENT DOCUMENTS

| | | | |
|---|---|---|---|
| 2,917,408 | 12/1959 | Goldstein et al. | 428/541 |
| 3,159,503 | 12/1964 | Goldstein et al. | 428/541 |
| 3,832,316 | 8/1974 | Juneja | 524/598 |
| 3,955,987 | 5/1976 | Schaar et al. | 106/18.15 |
| 4,301,217 | 11/1981 | Rohringer et al. | 428/528 |
| 4,438,028 | 3/1984 | Schmittmann et al. | 106/18.13 |
| 5,389,309 | 2/1995 | Lopez | 106/18.16 |
| 5,603,990 | 2/1997 | McGinniss et al. | 427/393.3 |

FOREIGN PATENT DOCUMENTS

| | | |
|---|---|---|
| 917334 | 12/1972 | Canada . |
| 496098 | 7/1992 | European Pat. Off. . |
| 4101539 | 7/1992 | Germany . |

OTHER PUBLICATIONS

Chemical Abstract No. 71:31561, abstract of an article by Koromyslova et al entitled "Manufacture of Fire–Resistant Wood Fiberboard", Nauch. Tr., Leningrad. Lesotekh. Akad. No. 100, 341–342, 1967.

JAPIO Patent Abstract No. JP361238791A, abstract of Japanese Patent Specification No. 61–238791, Oct. 1986.

WPIDS Abstract No. 92–251031, abstract of German Patent Specification No. 4101539 and EPO 496098, Jul. 1992.

*Primary Examiner*—Anthony Green
*Attorney, Agent, or Firm*—Pittenger & Smith, P.C.

[57] ABSTRACT

Fire retarding and smoke inhibiting aqueous composition and a method for a one-step impregnation of aqueous-absorbable—and normally inflammable materials, such as wood, paper and textiles, said composition comprising ammoniumphosphates, phosphoric acid, water soluble metal salts with ability to form water insoluble salts with phosphate ions and/or ammoniumphosphate ions, and other optional additives.

The composition comprises in combination:

- 0.5–90% by weight monoammoniumphosphate and/or diammoniumphosphate,
- 0.1–30% water-soluble metal salts with ability to form water insoluble salts with phosphate ions and/or ammoniumphosphate ions,
- 1–20% by weight acid especially phosphoric acid (85%),
- 1–15 % by weight dicyandiamide, and
- optionally up to 5% by weight additives in a total concentration of from 1 to 50% by weight with respect to the total weight of the aqueous solution, whereby phosphoric acid and dicyandiamide are present in the form of the reaction product guanylureaphosphate.

11 Claims, 1 Drawing Sheet

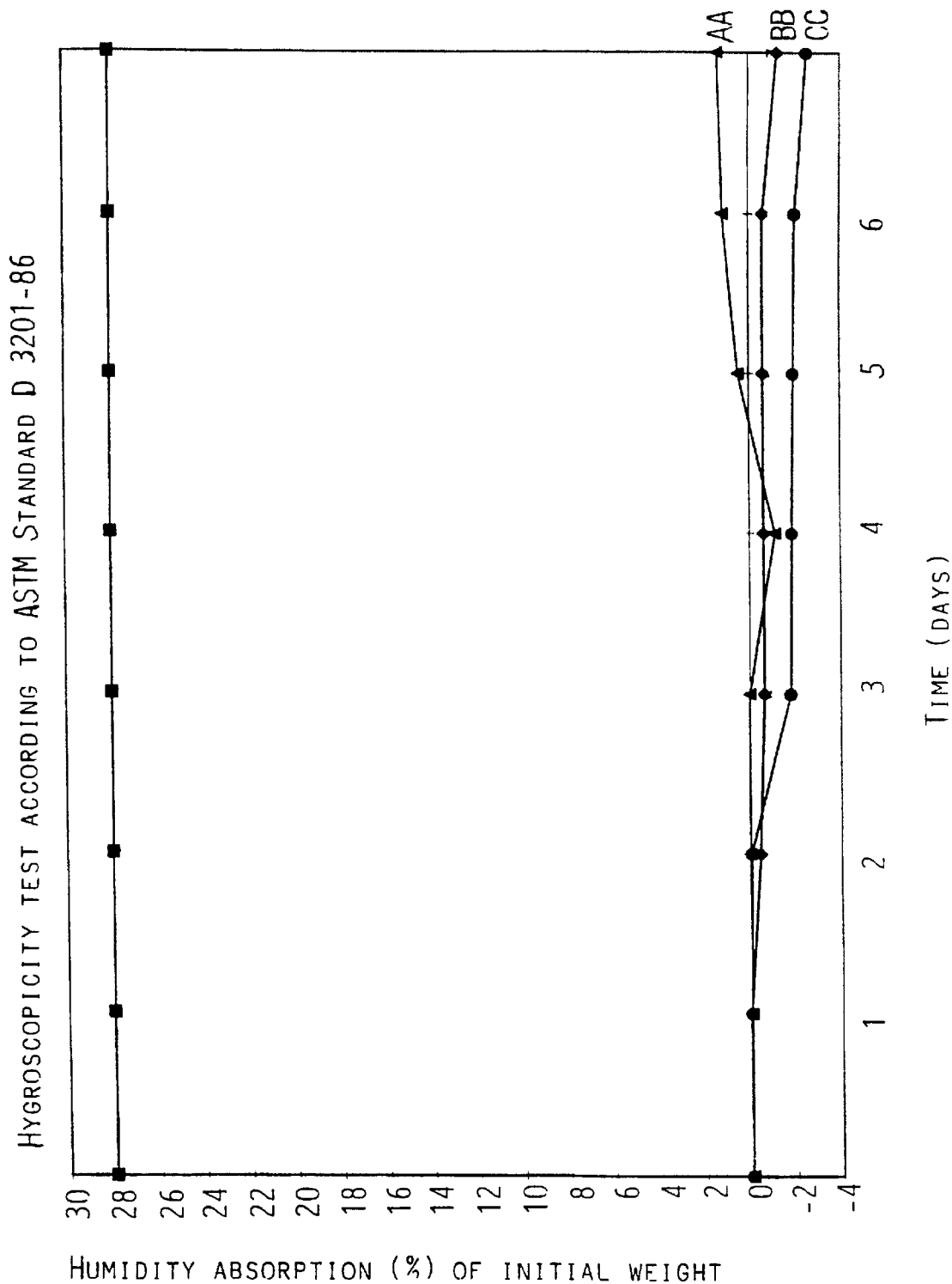

FIRE RETARDING COMPOSITION AND A METHOD FOR IMPREGNATION OF A COMBUSTIBLE MATERIAL

FIELD OF THE INVENTION

The present invention concerns a fire inhibiting agent and a method for protection of impregnable and normally combustible material.

BACKGROUND OF THE INVENTION

Several agents for impregnation of combustible materials are known. General problems with the known agents in general are: "sweating-out" of the impregnation agent and miscolouring of the impregnated material, a time consuming and expensive impregnation process comprising several steps is required, the impregnation agent is toxic, or that the fire- and fume inhibiting effect is simply not good enough.

More and more focus has been given to the flame inhibition of combustible wood and cellulose containing materials. Flame inhibition of wood materials has been developed in many areas in order to achieve a higher degree of safety for users of wood constructions, and can generally be divided into two main groups:

1. Flame inhibitors and protection methods that allow the wood and cellulose containing materials to keep their fire inhibited properties even after exposure to weather, wind and water. These are denoted "for outdoor use".
2. Fire inhibitors for wood and cellulose containing materials that do not maintain their fire inhibiting effect after being exposed to weather, wind or a relative humidity (RH) beyond approximately 90%. The fire inhibiting agents absorbed will tend to migrate outwards in the substrate material in order to equalize the concentration gradient, whereby the substrate material over some time will lose some of its fire inhibiting effect.

This category of fire retardants is denoted "for indoor use" and represents the dominate type of wood- and cellulose treatment in the present market. This treatment is usually cheaper than treatment with agents "for outdoor use".

In later years there has been a trend in the wood impregnating industry towards use of fire inhibiting products/composition mixtures that give low hygroscopicity and best possible resistance against being washed out and therefore can be used for outdoor purposes. Many of these fire inhibiting composition mixtures have been based on amine-aldehyde-phosphorus condensation compositions. Goldstein et al (U.S. Pat. No. 2,917,408) describes for instance the manufacture of wood with fire inhibiting properties by a combination of dicyandiamide and phosphoric acid, and in U.S. Pat. No. 3,159,503 is disclosed the manufacture of wood with fire inhibiting properties by a combination of dicyandiamide, phosphoric acid and minor amounts of formaldehyde. In addition, Juneja (U.S. Pat. No. 3,832,316) has described a fire inhibiting composition for wood consisting of dicyandiamide, melamine, formaldehyde and phosphoric acid. Juneja also describes (CA patent 917.334) a composition consisting of dicyandiamide, urea, formaldehyde and phosphoric acid to inhibit fire in wood.

Most of the technical solutions mentioned above suffer from one or more disadvantages: formaldehyde is not resistive against being washed out, is not resistant to high humidity, is not storage stable, has too high a hardening temperature (above 100° C.), and is too acidic for the wood, i.e. has too low pH, which over time will cause low compressive strength of the wood and will also cause corrosion of metal parts connected to- or in touch with impregnated wood.

In an attempt to overcome these disadvantages, there has been provided a composition for the impregnation of wood as disclosed in NO patent application No. 953316. According to that method the composition comprises 0.5–40% by weight of monoarnmoniumphosphate and/or diammoniumphosphate, 5–30% by weight of a water soluble and dissociatable ammonium compound, 10–60% by weight of a water soluble metal salt with the ability to form water insoluble salts with phosphate ions and/or ammoniumphosphate ions, 0–30% by weight of phosphoric acid (85%), 1–20% by weight acetic acid, and optionally up to 5% by weight additives, in a total concentration of from 1 to 55% by weight with respect to the total weight of the water solution. With this solution is obtained a high degree of saturation of fire inhibiting agent in the impregnated material with a corresponding good fire inhibiting effect, while at the same time avoiding discoloration of the wood and the known disadvantages usually associated with the use of fire inhibiting compositions as discussed above.

The composition according to NO-A-953316 above has, however, a relatively high content of free acetic acid, which in a process-technical context will be subject to disadvantages: the acetic acid compound will require extra security efforts, such as suitable protective equipment and correctly dimensioned outlet systems with respect to handling and use, and constitutes a potential health hazard for the working personnel. Furthermore, the composition requires a special program for drying plus separate equipment has to be installed to separate the acetic acid from the drying air before being released, and recovered acetic acid has to be treated in separate process equipment before being reused or destroyed. Thus, the acetic acid is a factor that makes the process significantly more expensive and is an environmental disadvantage for the process.

The objective of the present invention is consequently to obtain a method for the manufacture of a fire inhibiting composition for impregnation of normally combustible materials, like wood and other cellulose containing materials and textiles, where the method overcomes the disadvantages associated with known methods. The resulting composition shall further comply with the fire and material technical requirements of the impregnated material.

SUMMARY OF THE INVENTION

The present invention is directed to an aqueous impregnating composition for impregnating with a fire retarding and smoke inhibiting composition an aqueous absorbable, normally combustible material. The aqueous impregnating composition comprises an aqueous solution of the reaction product of 0.5–90% by weight of an ammonium phosphate selected from a group consisting of monoammonium phosphate, diammonium phosphate and mixtures thereof; 0.1–30% water soluble metal salts capable of forming water insoluble phosphate and ammonium phosphate salts; 1–20% by weight acid; and 1–15% by weight dicyandiamide, along with up to 5% by weight of additives. The reaction product provides a total concentration of 1–50% by weight with respect to the total weight of the aqueous solution.

This invention includes the method for impregnating the combustible material with the fire retarding and smoke inhibiting composition. This method includes the steps of impregnating the combustible material with the aqueous impregnating composition which is defined in the previous paragraph. In addition, the method includes the step of drying the impregnated material to form the fire retarding and smoke inhibiting characteristics in the material.

BRIEF DESCRIPTION OF THE DRAWING

The FIGURE is a graph showing the test results of the Hydroscopicity Test using the fire retarding composition of the present invention.

DETAILED DESCRIPTION OF THE INVENTION

According to the invention there is provided a fire- and smoke inhibiting aqueous composition for use in one-step impregnation of liquid absorbable and normally combustible materials, like wood, cellulose containing materials and textiles such as rayon, cotton and wool, the said composition comprises ammonium phosphates, water soluble metal salts and additives such as fungicides.

The composition comprises in combination:
- 0.5–90% by weight monoammoniumphosphate and/or diammoniumphosphate,
- 0.1–30% by weight water soluble metal salts with the ability to form water insoluble salts with phosphate ions and/or ammonium phosphate ions,
- 1–20% by weight acid,
- 1–15% by weight dicyandiamide and optionally up to 5% by weight additives in a total concentration of from 1 to 50% by weight with respect to the total weight of the water solution.

The inflammable materials in question are impregnated by a per se known method that provides sufficient absorption of the composition according to the invention, such as by soaking or by pressure-vacuum impregnation.

Subsequent to the impregnation the material in question is dried in a conventional manner, and shows a high concentration and evenly distributed content of fire inhibiting non-hygro-scopical salts, such as metal ammonium phosphate, guanylurea phosphate, and metal phosphate with no content of corrosion promoting acid. The impregnated material will, in addition, comply with the highest fire-technical classification according to the "Norsk Standard" (Norwegian Standard) and will be neutral with respect to color changes in the impregnated material.

The fire inhibiting agent is manufactured according to the present invention in one step by reacting water, dicyandiamide and antacid, such as hydrochloric acid (HCl), sulphuric acid ($H_2SO_4$), hydrobromic acid (HBr), formic acid (HCOOH), sulphamic acid ($NH_2SO_3H$) or oxi-acid of phosphorus, especially phosphoric acid ($H_3PO_4$), at a temperature in the range 70–95° C., preferentially 80° C. for a certain period of time, in a relation between dicyandiamide, acid and water such that an acid salt of guanylurea with pH between 2 and 3 is obtained, preferentially 2.6. This pH is obtained by using an equimolar relation between dicyandiamide and acid.

At elevated temperature with an equivalent amount of a mineral acid and dicyanamide the reaction product obtained will be a salt of guanylurea. This reaction is practically speaking quantitative, whereby in practice all the acid is converted in the reaction. Phosphoric acid is preferred, especially with respect to fire inhibiting properties in the impregnated material, in the manufacturing process and commercial availability. By use of phosphoric acid and dicyandiamide, guanylureaphosphate will be obtained as the reaction product. In the following, the invention is exemplified by use of phosphoric acid specifically.

The temperature range is chosen to yield a maximum amount of guanylureaphosphate at the preferred reaction time. The reaction between $H_3PO_4$ and dicyandiamide is assumed to proceed according to the following two steps:

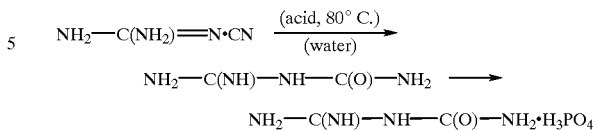

Temperatures which are too low will prevent the chemical reaction from taking place or lead to an extremely long reaction time. At temperatures above 95° C. boiling will occur resulting in reduced control of the process, of the reaction time, of vaporization and of the stability of the product composition.

To this reaction product is added more water, mono- and/or diammoniumphosphate, one or more metal salts with the ability to form water insoluble salts with ions of phosphate- and/or ammoniumphosphate, such as magnesium sulphate, magnesium chloride, magnesium acetate, and/or magnesium hydroxide. The pH is adjusted to the required end-level by addition of an acid or a base, preferentially phosphoric acid or an alkaline compound like diammoniumphosphate, magnesium hydroxide or ammonium carbonate. Na- and K-hydroxide may also be used, but are not very convenient as they enhance hygroscopicity. Any additives are added thereafter, among these are fungicides to prevent grow of microorganisms that usually grows in such solutions and on untreated wood.

The term "Phosphoric acid" is meant to include all oxi-acids of phosphorus, such as $H_3PO_4$, $H_3PO_3$, $2H_3PO4*H_2O$, $H_4P_2O_7$, $H_4P_2O_6$, $HPO_3$, the polyphosphoric acids and combinations of these acids.

The metal salts of interest in the present invention are the ones that form insoluble phosphates/ammoniumphosphates in the impregnated material. Examples of such metals are the alkaline earth metals Ca and Mg and metals from group IV of the periodic table of elements, e.g. Fe, Cu, and Zn. Examples of suitable metal salts for utilization with the present invention are chlorides of Cu, Zn, Ca, Mg and Fe, sulphates of Cu, Zn, Fe and Mg, acetates of Ca, Cu, Zn and Mg and hydroxides of Mg and Ca. Of these the magnesium salts are preferred due to several reasons: low price, low toxicity, good solubility in the start solution prior to the impregnation and low solubility after impregnation and drying. A skilled professional will however, from the basis of his knowledge and the support from the description, be able to find other metal salts that may be used according to the invention.

An advantage with the use of dicyandiamide with phosphorus in combination with other fire inhibiting components in a product-related connection, is that higher concentration of fire inhibiting components in the solution is obtained while at the same time it maintains a good resistance against moisture. Such a fire retardant product and its result is well suited for outdoor use. The mixture gives a synergetic effect as compared to the fire inhibition obtainable from two components separately.

The impregnated solution may have a varying content of salts, depending upon the kind of material it is absorbed in and the degree of fire inhibiting effect that is desired. Wood requires, for instance, a relatively high content of salts, at least 20% by weight, while other materials require less salt content.

Depending upon the required content of e.g. Mg-salts, at least some of or all of the magnesium sulphate may be replaced by magnesium hydroxide in order to reduce or eliminate the sulphate content of the solution.

The impregnation solution may be applied to the substrate material in question in a manner known per se. With respect to wood, a conventional pressure-vacuum impregnation processes may be used. This way the resulting impregnation will be evenly distributed in the material and will be practically non-hygroscopic.

Wood impregnated this way, due to the high content of dry-substances after drying, satisfies the highest classification of organic material according to Norsk Standard 3919, and does not have any disadvantages with respect to discoloration of the wood itself or corrosion of metal components connected to—or in contact with—impregnated wood. A preferred composition according to the invention, for wood and without additives comprises:

| Dicyandiamide | 1–15 % by weight |
| --- | --- |
| Monoammoniumphosphate | 10–70 % by weight |
| Ammonium carbonate | 0,1–5 % by weight |
| Magnesium hydroxide | 0,1–5 % by weight |
| Phosphoric acid 85% | 1–15 % by weight |

Such a mixture has the advantage that the impregnated wood demonstrates good fire inhibition, low hygroscopicity, is a good basis for varnish and stain, and shows low corrosion on nails or the like in or in contact with the wood.

Addition of magnesium salts is, as mentioned, made to in situ bond the magnesium ions to water insoluble magnesium phosphates and magnesium amrnoniumphosphates. In addition there may be added some lattice-forming material, e.g. in the form of polymer-forming organic monomers, which also improve fixing of the salts and make wood-based products and other combustible, water absorbing materials more resistant against being washed out after impregnation.

Manufacture of a Preferred Solution for Impregnation.

As described above, the impregnation solution with a basis in the preferred composition is manufactured the following way.

Beginning with an appropriate amount of water in an appropriate stainless steel vessel with stirring equipment, thermostat, cooling shell and pH-meter the following steps are taken:

a) dicyandiamide and phosphoric acid are added
b) the temperature is raised to 80° C. under stirring
c) this temperature is maintained for 3.5 hours
d) an appropriate amount of water is added still under continuous stirring
e) monoammoniumphosphate and magnesium hydroxide are added and stirring continued until everything is dissolved
f) the pH level is adjusted with ammonium carbonate to pH 4.0 still under stirring, and
g) optionally up to 5% by weight of additives are added.

The concentration of the solution is adjusted according to the respective utilization and may vary between 1–50% by weight. The pH of the solution may be reduced with sulphuric acid, hydrochloric acid, bromic acid, formic acid, acetic acid and/or phosphoric acid, or raised with alkaline compounds such as ammonium carbonate, ammonium hydroxide etc.

Impregnation of Wood

Impregnation of wood is most conveniently carried out in a conventional impregnation plant. After the wood has been placed in the impregnation plant, the wood is subjected to vacuum at 50 mbar for a minimum of 20 minutes. Impregnation fluid is thereafter let into the plant and the wood is subjected to pressure, preferentially at 16 bar until required amount of the solution has penetrated the wood (from 1 to 10 hours).

The solution should contain between 1–50% by weight dry substances calculated from the total weight of the solution, e.g. with the preferred composition as described above. The wood is dried in a conventional wood dryer preferentially at 60° C. and in an atmosphere of gradually reducing moisture. After drying the wood should contain 15–40% by weight of the impregnation composition (dry substances) calculated from the weight of dry wood.

Impregnation of Textiles

Textiles of cotton, rayon, wool, or mixed materials or textiles of other combustible, water absorbing materials may be soaked in the impregnation fluid or alternatively sprayed on. The concentration of the impregnation fluid will depend upon the type of treatment and will typically be within the range 5–25% by weight of dry substances calculated from the total weight of the fluid.

After soaking excess fluid is squeezed out and the textile is dried. After drying the textiles should have gained between 10 and 15% weight in the form of dry substances from the impregnation fluid. The impregnation of textiles according to the present invention also provides, contrary to comparable methods, an easily adjustable impregnation method with respect to the amount of fire inhibiting components which are to be absorbed by the textile.

Impregnation of Paper and Paper Products

Paper and paper products are impregnated practically the same way as textiles.

Fire Technical Tests

To demonstrate the fluid's effectiveness as a fire inhibiting and smoke inhibiting agent four parallel cotton textiles of 100×115 mm and 140 g/m$^2$ area weight, were impregnated with fluids manufactured according to the method described above and with compositions as shown in table 1 and aqueous solutions of: monoammoniumphosphate, borax and reaction products of dicyandiamide, water and phosphoric acid.

TABLE 1

Composition of the various impregnation solutions

| | The invention | | | Reference | | |
| --- | --- | --- | --- | --- | --- | --- |
| | AA (% by weight) | BB (% by weight) | CC (% by weight) | DD (% by weight) | EE (% by weight) | FF (% by weight) |
| Dicyandiamide | 0.56 | 1.35 | 0.45 | | | 6.35 |
| Mono-ammonium-phosphate | 12.83 | 11.60 | 9.33 | 15 | | |
| Phosphoric acid | 1.25 | 1.87 | 0.63 | | | 8.65 |
| Magnesium sulphate | | | 3.57 | | | |
| Magnesium hydroxide | 0.35 | 0.11 | | | | |
| Ammonium carbonate | | 0.13 | | | | |
| Diammonium-phosphate | | | 0.99 | | | |
| Borax | | | | | 15 | |
| Additive | 0.05 | 0.04 | 0.04 | | | |
| Water | 85.00 | 85.00 | 85.00 | 85.00 | 85.00 | 85.00 |
| Total | 100 | 100 | 100 | 100 | 100 | 100 |

The textile samples were then tested in the following way: The textile samples were suspended vertically on a vertically arranged beam. A Bunsen burner with a four cm flame height was used as the flame source. The flame source was placed under each test sample for 10 seconds. During the fire test it was observed whether visible flames from the samples occurred. After removal of the flame source it was observed whether the sample caught fire and/or glowed, and the height of the soot-area was measured in mm from the lowermost end of the sample to the upper end of the through-sooted area.

The mean values from this test are expressed in table 2, and show that the impregnated textile marked BB gives a better result than the reference solutions, such as monoammoniumphosphate and borax, both with respect to combustibility, glowing and smoke.

TABLE 2

| Test | catches fire | does not catch fire | glows | smoke | sooted area (mm) |
|------|--------------|---------------------|-------|-------|------------------|
| AA   |              | x                   | No    | No    | 70               |
| BB   |              | x                   | No    | No    | 53               |
| CC   |              | x                   | No    | No    | 93               |
| DD   |              | x                   | No    | No    | 58               |
| EE   |              | x                   | Yes   | Yes   | 73               |
| FF   | x            |                     | No    | Yes   | 115              |

Hygroscopicity Test

2×5 ml of the composition marked AA, BB and CC (table 1) was pipetted into Petri dishes and dried in a drying cabinet at 65° C. for three days. The Petri dishes were then placed in a closed climate chamber for hygroscopicity testing according to ASTM standard D 3201-86, where the criteria are 90±3%RH and 27±2° C. for 7 days. The samples were weighed once a day. The results are shown in the figure.

All the tests carried out on the composition according to the invention satisfied the requirements with good margin, which is <28% equilibrium humidity after 7 days to be classified as type A (according to AWPA) and conducted according to ASTM Standard D 3201-86, where the criteria are 90±3%RH and 27±2° C. for 7 days.

Thus, the present invention shows a new fire inhibiting composition and a method for impregnation of normally combustible material, that constitutes a process-technical beneficial one-step manufacture of the composition, as well as a composition that satisfies requirements with respect to hygroscopicity, toxicity, discoloration of impregnated material, and is environmentally harmless, cheap and has little corrosive effect on metal components connected to, or in touch with the impregnated material.

What is claimed is:

1. A fire retarding and smoke inhibiting aqueous composition for use in a one-step impregnation of aqueous-absorbable and combustible material wherein the composition comprises in combination:
   a) an aqueous solution,
   b) 0.5–90% by weight monoammoniumphosphate and/or diammoniumphosphate,
   c) 0.1–30% water soluble metal salts with ability to form water insoluble salts with phosphate ions and/or ammoniumphosphate,
   d) 1–20% by weight acid,
   e) 1–15% by weight dicyandiamide, and
   f) up to 5% by weight additives,
   in a total concentration of 1–50% by weight with respect to the total weight of the aqueous solution.

2. The composition according to claim 1, wherein the acid is phosphoric acid (85%).

3. The composition according to claim 1, wherein the composition comprises in combination:
   10–70% by weight monoammoniumphosphate,
   0.1–5% by weight ammonium carbonate,
   0.1–5% by weight magnesium hydroxide,
   1–15% by weight phosphoric acid (85%), and
   1–15% by weight dicyandiamide.

4. A method for impregnation of aqueous-absorbable and combustible material with an aqueous solution containing fire retarding components which are deposited within the impregnated material, the method comprising the steps of:
   a) reacting an acid and dicyandiamide in an aqueous solution to form an acid salt of guanylurea, and
   b) adding water, mono- and/or diammoniumphosphate, and one or more water-soluble metal salts with ability to form water insoluble salts with phosphate ions or ammoniumphosphate ions or both, and
   c) adjusting the pH of the composition with an acid or a base,
   d) impregnating the aqueous-absorbable and combustible material with the composition, and
   e) drying the impregnated material.

5. The method according to claim 4, wherein the acid is 85% phosphoric acid.

6. The method according to claim 5, wherein the phosphoric acid and the dicyandiamide is reacted at atmospheric pressure in the range 70–95° C.

7. The method according to claim 6, wherein the reaction is performed at 80° C.

8. The method according to claim 4, wherein the inflammable material is impregnated by soaking.

9. The method according to claim 4, wherein the inflammable material is impregnated by spraying.

10. The method according to claim 4, wherein the inflammable material is impregnated by a vacuum-pressure process.

11. A method for impregnation of aqueous-absorbable and combustible material as described in claim 4 wherein the pH is adjusted to between 2 and 3.

* * * * *